(12) United States Patent
Sprenkle et al.

(10) Patent No.: US 7,879,754 B2
(45) Date of Patent: Feb. 1, 2011

(54) SULFUR-TOLERANT CATALYST SYSTEMS

(75) Inventors: Vincent L. Sprenkle, Richland, WA (US); Kerry D. Meinhardt, Kennewick, WA (US); Lawrence A. Chick, West Richland, WA (US); Jin Yong Kim, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 12/106,423

(22) Filed: Apr. 21, 2008

(65) Prior Publication Data

US 2009/0264284 A1 Oct. 22, 2009

(51) Int. Cl.
*B01J 23/10* (2006.01)
(52) U.S. Cl. .................. 502/302; 502/304; 502/315; 429/40; 429/523; 429/502
(58) Field of Classification Search .............. 502/302, 502/304, 315; 429/40, 523, 502
See application file for complete search history.

(56) References Cited

U.S. PATENT DOCUMENTS

| | | | |
|---|---|---|---|
| 3,214,236 A * | 10/1965 | Weisz ...................... 423/213.2 |
| 5,447,705 A | 9/1995 | Petit et al. |
| 6,479,178 B2 | 11/2002 | Barnett |
| 6,800,388 B2 * | 10/2004 | Kaneko et al. ................. 429/19 |
| 7,153,412 B2 | 12/2006 | Inaba et al. |
| RE39,553 E * | 4/2007 | Li ............................ 423/239.1 |
| 2003/0099593 A1* | 5/2003 | Cortright et al. .......... 423/648.1 |
| 2004/0086772 A1* | 5/2004 | Chianelli et al. ............... 429/40 |
| 2004/0173450 A1* | 9/2004 | Fisher et al. ................. 204/164 |
| 2006/0280998 A1* | 12/2006 | Ying et al. .................... 429/40 |
| 2008/0034740 A1* | 2/2008 | Strehlau et al. ............... 60/299 |
| 2008/0292922 A1* | 11/2008 | Fischer ........................ 429/17 |

FOREIGN PATENT DOCUMENTS

| | | |
|---|---|---|
| EP | 0 249 305 A2 | 12/1987 |
| EP | 0 996 184 A2 | 4/2000 |
| EP | 1 750 317 A1 | 2/2007 |
| JP | 2008 188587 A | 8/2008 |
| WO | WO2009/042234 A2 | 4/2009 |

OTHER PUBLICATIONS

Gong, et al., "Sulfur-tolerant anode materials for solid oxide fuel cell application", Journal of Power Sources, Science Direct, Elsevier, Mar. 9, 2007, 289-298, 168.
Mullins, et al., "Adsorption and reaction of hydrogen sulfide on thin-film cerium oxide", Surface Science, Aug. 16, 2007, 4931-4938, 601.
Kim, et al., "Direct oxidation of sulfur-containing fuels in a solid oxide fuel cell", The Royal Society of Chemistry, Oct. 2001, 2334-2335.
Kurokawa, et al., "Y-doped SrTiO3 based sulfur tolerant anode for solid oxide fuel cells", Journal of Power Sources, Nov. 23, 2006, 510-518, 164.
Sun, et al., "Recent anode advances in solid oxide fuel cells", Journal of Power Sources, Jun. 17, 2007, 247-260, 171.
International Search Report/Written Opinion.

* cited by examiner

*Primary Examiner*—Timothy C Vanoy
*Assistant Examiner*—Michelle Hou
(74) *Attorney, Agent, or Firm*—Allan C. Tuan

(57) ABSTRACT

Methods for improving the sulfur-tolerance of nickel-based catalyst systems, as well as the improved catalyst systems, are disclosed. The methods can include adding praseodymium alone, or in combination with ruthenium and/or cerium, to a nickel-based catalyst system, thereby inhibiting sulfur poisoning of the catalyst system. Improved catalyst systems can have an added amount of praseodymium alone, or in combination with ruthenium and/or cerium, sufficient to inhibit poisoning of the system by sulfur.

8 Claims, 2 Drawing Sheets

SULFUR-TOLERANT CATALYST SYSTEMS

STATEMENT REGARDING FEDERALLY SPONSORED RESEARCH OR DEVELOPMENT

This invention was made with United States Government support under contract DE-PS26-00NT40854 to Battelle Memorial Institute. The Government has certain rights in this invention.

BACKGROUND

The performance of catalyst systems, particularly those that are nickel-based, can be significantly degraded by sulfur, and/or sulfur-containing compounds, which poison the catalyst. For instance, hydrogen sulfide, which is present in most common fossil fuel sources, can cause a significant poisoning of nickel-based anodes in solid oxide fuel cells (SOFC). In a specific example, a nickel-YSZ-based anode can typically show a 35-50% drop in power within 20 hours when even one ppm of hydrogen sulfide is present in the fuel. While desulfurizers can be employed to treat sulfur-containing reactants prior to reacting them on a nickel-based catalyst, such desulfurizers are often costly and/or bulky. Accordingly, a need exists for nickel-based catalyst systems having improved sulfur tolerance.

SUMMARY

Aspects of the present invention are encompassed by methods for improving sulfur tolerance in catalyst systems and by the improved catalyst systems themselves. Specifically, according to some embodiments, methods for improving sulfur tolerance in catalyst systems comprise adding praseodymium to the catalyst system, thereby inhibiting sulfur poisoning of the catalyst system. Suitable catalyst systems can include those that are susceptible to sulfur poisoning, and can include, but are not limited to those based on Ni, Rh, and Pt. In other embodiments, methods can further comprise adding a combination of either ruthenium and praseodymium or cerium and praseodymium to the catalyst system. A catalyst system, as used herein, comprises a catalyst having metal, metal alloys, and/or metal-cermets for standard catalysis applications (e.g., reformation, etc.) or for alternative applications (e.g., electrochemistry on fuel cell electrodes). Exemplary metals can include, but are not limited to Ni, Rh, and Pt.

In specific embodiments, the adding of praseodymium, or of either praseodymium and ruthenium or praseodymium and cerium, to the catalyst system can comprise infiltrating the catalyst system with a solution comprising the praseodymium, the praseodymium and ruthenium, or the praseodymium and cerium. Alternatively, the adding can comprise the addition of powders comprising praseodymium, praseodymium and ruthenium, or praseodymium and cerium to a feedstock for the catalyst system and the subsequent application of powder processing techniques. The methods described herein of adding Pr-based materials are preferred embodiments and are not intended to preclude from the scope of the present invention the use of other methods that may produce equivalent results.

In a particular embodiment, the method of adding praseodymium alone, or in combination with Ru and/or Ce, is performed in a solid oxide fuel cell (SOFC), wherein a fuel-cell anode comprises a nickel-based catalyst system. In one such embodiment, the nickel-based catalyst system can comprise porous nickel-YSZ.

In other embodiments, the present invention can also encompass a catalyst system comprising an added amount of praseodymium sufficient to inhibit poisoning of the system by sulfur. The praseodymium can exist in mixed valence states. For example, the catalyst system can comprise a mixed phase of $Pr^{3+}$ and $Pr^{4+}$. Furthermore, the catalyst system can also comprise ruthenium and/or cerium. In a specific embodiment, a nickel-based catalyst system comprises nickel-YSZ, and is part of an anode in a fuel-cell.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, various embodiments, including the preferred embodiment, of the invention, are shown and described, at least, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

Figure 1:
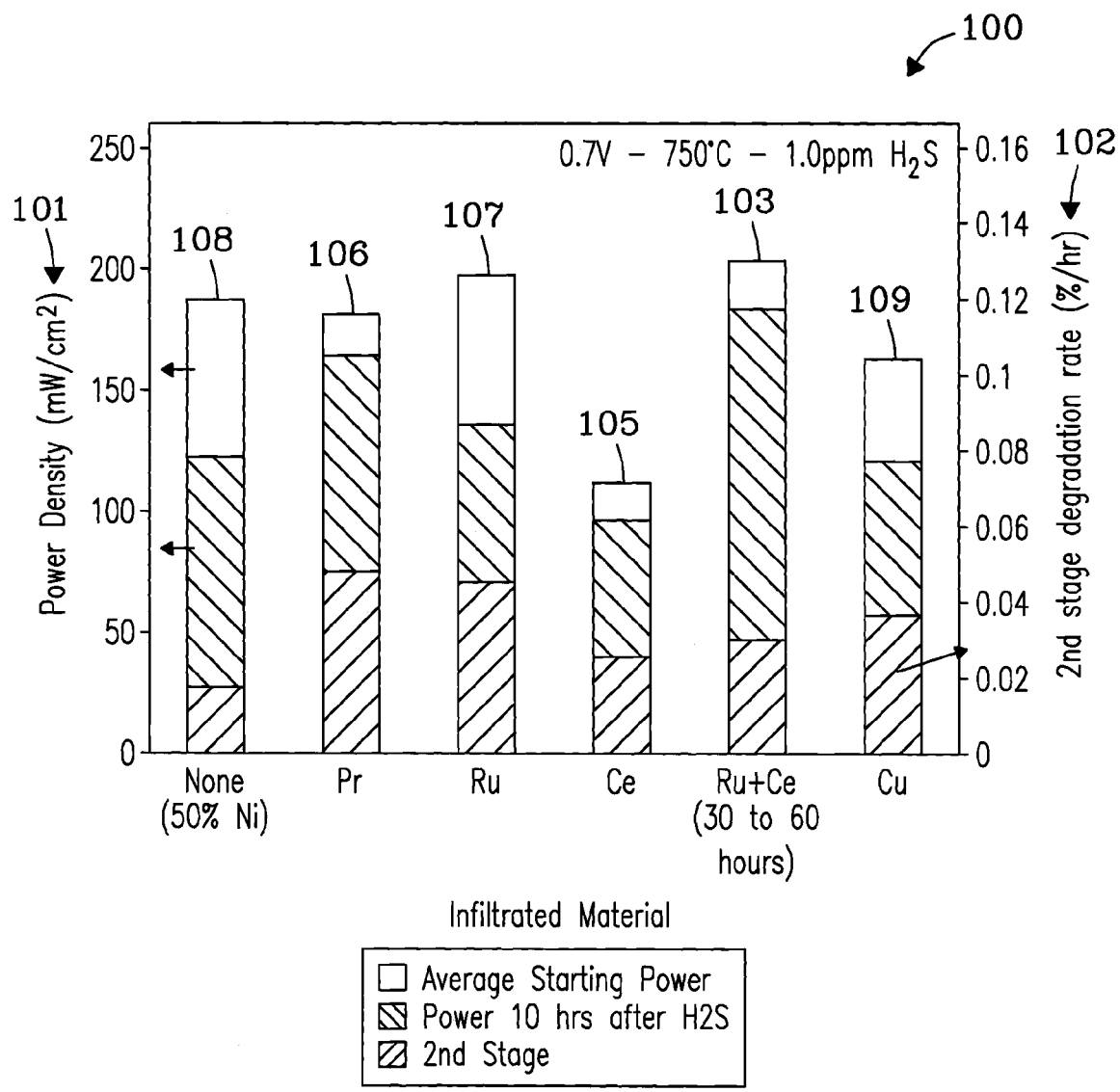
FIG. 1 is a bar graph showing the performance of various Ni-based catalyst systems, according to embodiments of the present invention, as implemented in a fuel cell structure.

The following description includes the preferred best mode of one embodiment of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

According to some embodiments of the present invention, praseodymium alone, or in combination with ruthenium and/or cerium, can be added to the nickel-based catalyst system through infiltration of the catalyst system with a solution comprising the praseodymium, praseodymium and ruthenium, or praseodymium and cerium. For example, in a particular instance, infiltration of an anode in a fuel cell by Pr-based materials was conducted using aqueous solutions of praseodymium (III) nitrate hydrate ($Pr(NO_3)_3 \cdot xH_2O$), nickel (II) nitrate hexahydrate ($Ni(NO_3)_2 \cdot 6H2O$), cerium (IV)

ammonium nitrate $((NH_4)_2Ce(NO_3)_6)$ and/or ruthenium chloride hydrate $(RuCl_3 \cdot xH2O)$. The concentration of each solution was approximately 1 mol/kg. A praseodymium nitrate solution alone or mixtures of a praseodymium nitrate solution and other solutions were infiltrated from the porous anode side of a cell. To prevent the solution from smearing onto the cathode, the cathode was covered with paper and the electrolyte on the cathode side was sealed with tape. After the pores of anode were filled with the solution, the cell was dried at room temperature. Infiltration and drying were repeated 4-5 times until no more solution could be infiltrated into the pores. To help the solution get all the way into the electrolyte/anode interface, surfactants such as the nonionic surfactants, TRITON X-45 or TRITON X-100, were added into the solution and/or the solution-filled cell was kept under vacuum after each infiltration. The infiltrated cell was then fired at 600° C. for 1 hr to decompose the nitrates into oxides. After firing, the residue left on the anode side of the fired cell was cleaned up. Infiltration and firing were typically repeated 4 times until a desirable amount of the infiltrates were deposited at the electrolyte/anode interface.

In other embodiments, rather than infiltrating the nickel-based catalyst system, the praseodymium-based materials can be added by mixing powders containing Pr with, or without, Ru and/or Ce, to powders containing starting materials for the nickel-based catalyst system. The powders can then be processed according to conventional powder processing techniques. In one example, anode-supported SOFC's, according to embodiments of the present invention, were fabricated by tape casting and lamination techniques. More specifically, bulk anode slurries were prepared with NiO, 5-mole % YSZ, SiC and carbon black to yield 40-vol % Ni metal in the final anode. Active anode slurries were prepared from NiO and an 8-mole % YSZ and were batched to yield 50 vol % Ni in the reduced anode. For optimal incorporation, active anodes were prepared with up to 40 vol % carbon fugitive phase. Electrolyte tapes were prepared using the 8-mole % YSZ powder. For all tape cast slurries, the raw materials were dispersed in a MEK/ethanol solvent mixture before addition of the selected binder and plasticizer systems. Bulk anode tapes were cast to yield dried tapes ~130 μm thick, while active anode and electrolyte tapes were cast to yield dried tapes 12-15 μm in thickness. 5 plies of bulk anode tape and single plies of both the active anode and electrolyte were roll laminated and laser cut before sintering to 1375° C. for 1.0 hr. Sintered bilayers were nominally 0.5 mm in thickness with electrolyte and active anode thickness of 5-7 μm. After sintering of the NiO-YSZ anode supported cell and subsequent application of the cathode, the anode supported cells are infiltrated following the procedure detailed elsewhere herein, in which metal nitrates comprising Pr, Ni, Ce, and/or Ru are infiltrated into retained porosity of the NiO-YSZ anode.

Referring to FIG. 1, a bar graph 100 is presented indicating the effect of sulfur poisoning on the power densities (mW/$cm^2$) 101 and the second stage degradation rates (%/hr) 102 of various fuel cells comprising an electrolyte supported cell containing nickel-YSZ anodes that had been infiltrated with materials affecting the anodes' sulfur tolerance. Second stage degradation, as used in this example, refers to the degradation in performance that occurred 10 or more hours after the introduction of 1.0 ppm $H_2S$. The cells were operated at a constant 0.7 V for approximately 100 hours prior to the introduction of 1.0 ppm $H_2S$. Testing occurred in a standard button cell test stand with a 48.5% $H_2$/48.5% $N_2$/3% $H_2O$ fuel mixture. The baseline cells comprised electrolyte-supported cells in which the active anode composition was screen-printed onto an approximately 300 μm thick, 8 mol % $Y_2O_3$-doped zirconia electrolyte. The active anode composition, which comprised 50 vol % nickel in a reduced anode, was screen printed to yield a 20-30 μm print after sintering at 1375° C. for approximately 2 hours in order to stimulate the appropriate anode supported conditions. Baseline cells were then infiltrated by preparing 1 mole/kilogram aqueous solutions from nitrites and chlorides of cerium, praseodymium, ruthenium, ruthenium+cerium, and copper.

The bar 108 representing the baseline cell indicates that, under the previously described conditions, initial power densities are approximately 180 mW/$cm^2$ and that the cells retain approximately 66% of the initial power 10 hours after introduction of the $H_2S$. The second stage degradation rate for the baseline cell is approximately 0.017%/hour. Referring to bar 109, infiltration with copper resulted in similar but decreased performance relative to the baseline cell, with an initial power value of 163 mW/$cm^2$, a 74% power retention after 10 hours of sulfur exposure, and a second stage degradation rate of 0.037%/hour. Similarly, infiltration with the ruthenium-containing solution did not result in substantially better performance compared to the baseline cell. The ruthenium-modified cell, according to bar 107, exhibited an initial power density of approximately 197 mW/$cm^2$ and retain approximately 69% of the initial power after 10 hours of $H_2S$ exposure. Modification with ruthenium, however, did improve the second stage degradation rate by almost a factor of three. Infiltration with the cerium-containing solution, as indicated by bar 105, resulted in a decrease of 40% in the initial power density. However, the cell modified by cerium was able to retain approximately 88% of the initial power density, which was an initial power density value that was markedly lower than that of the baseline cell. Accordingly, with respect to ruthenium and cerium, improved performance and sulfur tolerance was only realized with a combination of ruthenium and cerium, as indicated by bar 103. The combined ruthenium and cerium infiltration resulted in an initial power density of 203 mW/$cm^2$, a 90% retention after 10 hours of $H_2S$ exposure, and a second stage degradation rate of about 0.030%/hour. In this context, it was surprising to find that infiltration with praseodymium alone, as indicated by bar 106, resulted in the greatest tolerance to sulfur poisoning. The praseodymium-infiltrated cell exhibited an initial power of 181 mW/$cm^2$, a 91% retention of initial power after 10 hours of $H_2S$ exposure, and a 0.047%/hour the second stage degradation rate, which is double the value of the baseline cell.

Figure 2:
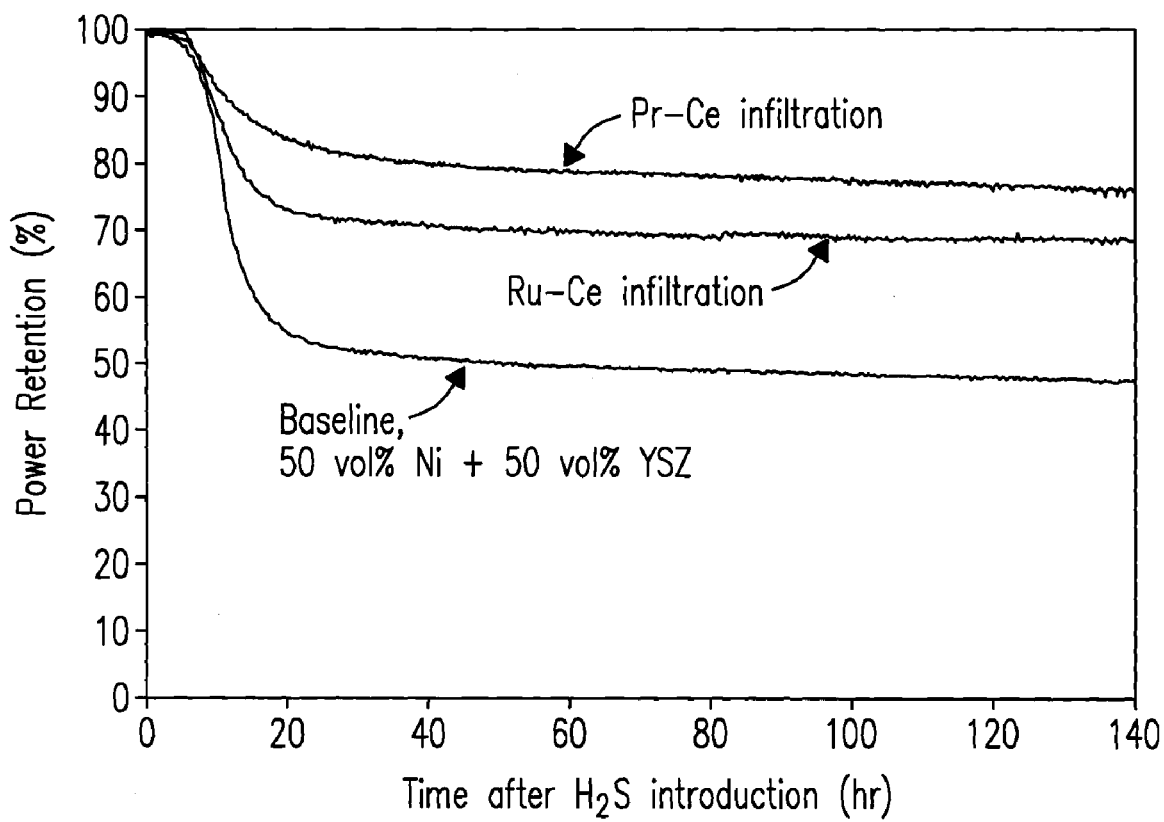
FIG. 2 shows electrochemical performance of various cells after introduction of $H_2S$ with 50/50 $N_2/H_2$ fuel.

Referring to FIG. 2, a graph is presented indicating the improved performance of a Ni-based catalyst system having additions of both Pr and Ce according to embodiments of the present invention. More specifically, the sulfur tolerance of a Pr—Ce infiltrated cell is compared with a Ni-YSZ anode supported baseline cell and a Ru—Ce infiltrated cell. Sulfur tolerance was measured using power retention as an indicator, wherein the percentage of power after sulfur poisoning is compared to the power before 1 ppm hydrogen sulfide (H2S) was introduced into a 50/50 fuel mixture comprising $H_2$ and $N_2$. As shown in the Figure, the Ni-YSZ anode retained approximately 50% of the power after the rapid 1st stage degradation (i.e., at 50 hrs after $H_2S$ introduction). The cell that was infiltrated with praseodymium and cerium exhibited significant improvement in sulfur tolerance (e.g., approximately 79% retention after the 1st stage degradation). The sulfur tolerance of the Pr—Ce infiltrated cell was even better than that of a Ru—Ce infiltrated cell, which retained ~70% of the power after the 1st stage degradation.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A method for performing electrochemistry on fuel cell electrodes comprising a catalyst system, the method characterized by the step of reacting a sulfur-containing fuel on the catalyst system, which comprises a nickel-based catalyst and praseodymium, wherein the praseodymium inhibits sulfur poisoning of the catalyst.

2. The method of claim 1, wherein the catalyst system further comprises ruthenium.

3. The method of claim 1, wherein the catalyst system further comprises cerium.

4. The method of claim 1, wherein the catalyst system further comprises ruthenium and cerium.

5. The method of claim 1, wherein the nickel-based catalyst comprises porous Ni-YSZ.

6. The method of claim 1, wherein the catalyst system is continuously exposed to the sulfur-containing fuel.

7. The method of claim 1, wherein the praseodymium exists in mixed valence states.

8. A method for performing electrochemistry on fuel cell electrodes comprising a catalyst system, the method characterized by the step of reacting a sulfur-containing fuel on the catalyst system, which comprises a catalyst and a mixed phase of $Pr^{3+}$ and $Pr^{4+}$, wherein the mixed phase of praseodymium inhibits sulfur poisoning of the catalyst.

* * * * *